(12) United States Patent
Chen et al.

(10) Patent No.: US 8,543,614 B2
(45) Date of Patent: Sep. 24, 2013

(54) PACKING NODES INTO RECORDS TO STORE XML XQUERY DATA MODEL AND OTHER HIERARCHICALLY STRUCTURED DATA

(75) Inventors: Yao-Ching Stephen Chen, Saratoga, CA (US); Yue Huang, San Jose, CA (US); Fen-Ling Lin, San Jose, CA (US); Brian Thinh-Vinh Tran, San Jose, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 11/209,997

(22) Filed: Aug. 22, 2005

(65) Prior Publication Data

US 2007/0043743 A1    Feb. 22, 2007

(51) Int. Cl.
*G06F 17/30* (2006.01)
(52) U.S. Cl.
USPC .......................................... 707/802; 707/790
(58) Field of Classification Search
USPC ....... 707/6, 101, 790, 797, 999.006, 999.101, 707/802
See application file for complete search history.

(56) References Cited

U.S. PATENT DOCUMENTS

| | | | |
|---|---|---|---|
| 4,794,528 A * | 12/1988 | Hirose et al. ........... | 707/999.006 |
| 5,151,697 A | 9/1992 | Bunton | |
| 5,608,904 A | 3/1997 | Chaudhuri et al. ........... | 395/602 |
| 5,706,498 A * | 1/1998 | Fujimiya et al. .................. | 707/6 |
| 5,883,589 A | 3/1999 | Takishima et al. | |
| 6,058,397 A | 5/2000 | Barrus et al. | |
| 6,085,188 A * | 7/2000 | Bachmann et al. ............... | 707/3 |
| 6,263,332 B1 | 7/2001 | Nasr et al. | |
| 6,295,526 B1 | 9/2001 | Kreiner et al. | |
| 6,313,766 B1 | 11/2001 | Langendorf et al. | |
| 6,353,820 B1 | 3/2002 | Edwards et al. | |

(Continued)

FOREIGN PATENT DOCUMENTS

| JP | 08190543 A2 | 7/1996 |
|---|---|---|
| JP | 2001034619 | 2/2001 |

(Continued)

OTHER PUBLICATIONS

Kanne, Carl Christian, et al., "Efficient Storage of XML Data," Universitat Mannheim, Germany, Jun. 16, 1999, pp. 1-20.

(Continued)

*Primary Examiner* — Mahesh Dwivedi
(74) *Attorney, Agent, or Firm* — IP Authority, LLC; Ramraj Soundararajan

(57) ABSTRACT

A storage of nodes of hierarchically structured data uses logical node identifiers to reference the nodes stored within and across record data structures. A node identifier index is used to map each logical node identifier to a record identifier for the record that contains the node. When a sub-tree is stored in a separate record, a proxy node is used to represent the sub-tree in the parent record. The mapping in the node identifier index reflects the storage of the sub-tree nodes in the separate record. Since the references between the records are through logical node identifiers, there is no limitation to the moving of records across pages, as long as the indices are updated or rebuilt to maintain synchronization with the resulting data pages. This approach is highly scalable and has a much smaller storage consumption than approaches that use explicit references between nodes.

6 Claims, 8 Drawing Sheets

(56) References Cited

U.S. PATENT DOCUMENTS

| | | | |
|---|---|---|---|
| 6,381,605 | B1 | 4/2002 | Kothuri et al. |
| 6,437,799 | B1 * | 8/2002 | Shinomi ..................... 345/666 |
| 6,510,434 | B1 | 1/2003 | Anderson et al. |
| 6,539,369 | B2 | 3/2003 | Brown |
| 6,539,396 | B1 | 3/2003 | Bowman-Amuah |
| 6,563,441 | B1 | 5/2003 | Gold |
| 6,587,057 | B2 | 7/2003 | Scheuermann |
| 6,610,104 | B1 | 8/2003 | Lin et al. ..................... 715/511 |
| 6,647,391 | B1 | 11/2003 | Smith et al. |
| 6,810,414 | B1 | 10/2004 | Brittain ..................... 709/219 |
| 6,889,226 | B2 | 5/2005 | O'Neil et al. |
| 6,985,898 | B1 * | 1/2006 | Ripley et al. ........... 707/999.005 |
| 7,072,904 | B2 | 7/2006 | Najork et al. |
| 7,080,065 | B1 | 7/2006 | Kothuri et al. |
| 7,133,865 | B1 | 11/2006 | Pedersen et al. |
| 7,246,138 | B2 | 7/2007 | McCauley et al. |
| 7,274,671 | B2 | 9/2007 | Hu |
| 7,293,005 | B2 | 11/2007 | Fontoura et al. |
| 7,293,028 | B2 | 11/2007 | Cha et al. |
| 7,333,982 | B2 | 2/2008 | Bakalash et al. |
| 7,716,253 | B2 | 5/2010 | Netz et al. |
| 2002/0099715 | A1 | 7/2002 | Jahnke et al. .................. 707/100 |
| 2002/0120679 | A1 | 8/2002 | Hayton et al. |
| 2002/0145545 | A1 | 10/2002 | Brown |
| 2003/0014397 | A1 | 1/2003 | Chau et al. .................. 707/3 |
| 2003/0023528 | A1 | 1/2003 | Wilce et al. ..................... 705/35 |
| 2003/0088639 | A1 | 5/2003 | Lentini et al. |
| 2004/0002939 | A1 | 1/2004 | Arora et al. ..................... 707/1 |
| 2004/0044959 | A1 | 3/2004 | Shanmugasundaram et al. ................. 715/513 |
| 2004/0111672 | A1 | 6/2004 | Bowman et al. |
| 2004/0128296 | A1 | 7/2004 | Krishnamurthy et al. .... 709/219 |
| 2004/0167864 | A1 | 8/2004 | Wang et al. ..................... 707/1 |
| 2004/0167915 | A1 | 8/2004 | Sundararajan et al. ........ 707/100 |
| 2004/0205638 | A1 | 10/2004 | Thomas et al. ............... 715/526 |
| 2005/0055336 | A1 | 3/2005 | Hui et al. ..................... 707/3 |
| 2005/0125431 | A1 | 6/2005 | Emmick et al. |
| 2005/0192955 | A1 | 9/2005 | Farrell |
| 2005/0210052 | A1 * | 9/2005 | Aldridge ..................... 707/101 |
| 2006/0004792 | A1 * | 1/2006 | Lyle et al. ..................... 707/100 |

FOREIGN PATENT DOCUMENTS

| | | | |
|---|---|---|---|
| JP | 2002269139 | A2 | 9/2002 |
| JP | 2004178084 | | 6/2004 |
| WO | WO0142881 | A2 | 8/2001 |
| WO | WO 02/03245 | A1 | 1/2002 |
| WO | WO0203245 | | 1/2002 |

OTHER PUBLICATIONS

Elias, "Interval and Recency Rank Souce Coding Two On-Line Adaptive Variable Length Schemes," IEEE Transactions on Information Theory, V IT-33, N1, Jan. 1987, pp. 3-10.

Tadayon et al., "Grouping Algorithm for Lossless Data Compression," IEEE Computer Society, Data Compression Conference, Mar. 30-Apr. 1 1998, 15pgs.

Grust, "Accelerating XPath Location Steps," ACM SIGMOD 2002, Jun. 4-6, 2002, Madison, WI, pp. 109-120.

Bremer et al., "An Efficient XML Node Identification and Indexing Scheme," Technical Report CSE-2003-04, Dept. of Computer Science, University of California at Davis, 2003, 14pgs.

Bruno et al., "Holistic Twig Joins: Optimal XML Pattern Matching," ACM SIGMOD 2002, Jun. 4-6, 2002, Madison, WI, pp. 310-321.

Li et al., "Indexing and Querying XML Data for Regular Path Expressions," Proceedings of the 27th International Conference on VLDB, Sep. 11-14, 2001, Rome, Italy, pp. 361-370.

Cohen et al., "Labeling Dynamic XML Trees," Proceedings of the 21st ACM SIGMOD-SIGACT-SIGART Symposium on Principles of Database Systems, Jun. 4-6, 2002, Madison, WI, pp. 271-281.

Jagadish et al., "On Effective Multi-Dimensional Indexing for Strings," ACM SIGMOD 2000, May 14-19, 2000, Dallas, TX, pp. 403-414.

"Technique for Performing Generalized Prefix Matches," IBM Technical Disclosure Bulletin, V40, N3, Mar. 1997, pp. 189-200.

Wang et al. ,"ViST: A Dynamic Index Method for Querying XML Data by Tree Structures," ACM SIGMOD 2003, Jun. 9-12, 2003, San Diego, CA, pp. 110-121.

Guo et al., "XRANK: Ranked Keyword Search over XML Documents," ACM SIGMOD 2003, Jun. 9-12, 2003, San Diego, CA, pp. 16-27.

Garofalakis et al., "XTRACT: A System for Extracting Document Type Descriptors from XML Documents," ACM SIGMOD 2000, Dallas, TX, V29, N2, pp. 165-176.

Kanne, Carl-Christian et al., "Efficient Storage of XML Data," Universität Mannheim, Germany, Jun. 16, 1999, pp. 1-20.

Zhang, Guogen (Gene), "XML Data Model Storage," IBM Confidential, Mar. 17, 2004, pp. 1-10.

Zhang, Guogen (Gene), "XML Data Model Storage Advanced Features," IBM Confidential, Apr. 25, 2004, pp. 1-4.

Glance, Natalie S. et al., "Generalized Process Structure Grammars (GPSG) for Flexible Representations of Work," Proceedings of the 1996 ACM Conference on Computer Supported Cooperative Work, pp. 180-189.

Thorsten Fiebig, et al., Anatomy of a native XML base management system, VLDB Journal, Springer Verlag, Berlin, DE, vol. 11, 2002, pp. 292-314.

Thorsten Fiebig, et al., Anatomy of a Native XML Base Management System, URL:http://citeseer.ist.psu.edu/fiebig02anatomy.html, pp. 1-52, Dec. 2002.

Sihem Amer-Yahia, et al., Logical and Physical Support for Heterogeneous Data, Proceedings of the 11th International Conference on Information and Knowledge Management. CIKM 2002 ACM New York, NY, Nov. 4-9, 2002, pp. 270-281.

* cited by examiner

| Node No. | Local Node ID | Absolute Node ID |
|---|---|---|
| 0 | 00 | 00 |
| 1 | 02 | 02 |
| 2 | 02 | 0202 |
| 3 | 02 | 020202 |
| 4 | 04 | 020204 |
| 5 | 06 | 020206 |
| 6 | 04 | 0204 |
| 7 | 06 | 0206 |
| 8 | 02 | 020602 |

| Doc ID | Node ID | RID |
|---|---|---|
| docid | 02 | rid2 |
| docid | 020206 | rid1 |
| docid | 020602 | rid2 |

PACKING NODES INTO RECORDS TO STORE XML XQUERY DATA MODEL AND OTHER HIERARCHICALLY STRUCTURED DATA

CROSS-REFERENCE TO RELATED APPLICATIONS

This application is related to application Ser. No. 11/161,908, entitled "XML Sub-Document Versioning Method in XML Databases Using Record Storages," filed Aug. 22, 2005, and application Ser. No. 11/209,598, entitled "Scalable Storage Schemes for Native XML Column Data of Relational Tables," filed Aug. 22, 2005, both of which are assigned to the assignee of the present application.

FIELD OF THE INVENTION

The present invention relates to hierarchically structured data, and more particularly to the storage of hierarchically structured data in a database.

BACKGROUND OF THE INVENTION

As hierarchically structured data, such as eXtensible Mark-up Language (XML), become widely used as a data format, it also becomes a native data type for database systems. The storage of hierarchically structured data in relational databases, however, poses particular challenges.

One conventional approach is to store XML as text. This approach preserves the original documents and retrieves the entire document. However, it is inefficient in supporting queries and document updates, especially when the document is large.

Another conventional approach is to decompose and store the XML as tables in the relational database. This requires either a special relational schema for each XML schema or a generic relational representation for the XML data model. However, the result data is relatively large, and the queries are usually slow to execute.

Another conventional approach uses an object data model to store XML tree data, where many direct references or pointers are stored in the records for the parent-child relationships. However, this approach lacks scalability, has a larger data volume due to the references, and is less flexible in the re-organization of records.

Another conventional approach decomposes the XML data at a high level into relational data. However, this approach is inefficient in that it places lower levels and long text into a Character Large Object (CLOB), or it stores the original textual XML redundantly along with the object model.

Accordingly, there exists a need for an improved method and system for storing hierarchically structured data in record data structures. The improved method and system should combine the advantages of relational scalability and flexibility for the re-organization of records and the object efficiency for traversal and update. The present invention addresses such a need.

SUMMARY OF THE INVENTION

An improved method and system for storing hierarchically structured data in record data structures uses logical node identifiers to reference the nodes of a hierarchically structured data stored within and across relational data structures, such as records or pages of records. A node identifier index is used to map each logical node identifier to a record identifier for the record that contains the node. When a sub-tree is stored in a separate record, a proxy node is used to represent the sub-tree in the parent record. The mapping in the node identifier index reflects the storage of the sub-tree nodes in the separate record. This storage scheme supports document order clustering and sub-document update with the record as the unit. Since the references between the records are through logical node identifiers, there is no limitation to the moving of records across pages, as long as the indices are updated or rebuilt to maintain synchronization with the resulting data pages. The method and system in accordance with the present invention thus is significantly more scalable than conventional approaches. It has a much smaller storage consumption than conventional object approaches that uses explicit references between nodes.

DETAILED DESCRIPTION

The present invention provides an improved method and system for storing hierarchically structured data in record data structures. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention uses logical node identifiers to reference the nodes of a hierarchically structured data stored within and across relational data structures, such as records or pages of records. A node identifier index is then used to map each logical node identifier to a record identifier for the record that contains the node. When a sub-tree is stored in a separate record, a proxy node is used to represent the sub-tree in the parent record. The mapping in the node identifier index is then updated to reflect the storage of the sub-tree nodes in the separate record. In this manner, when re-organization of records are desired or needed, only the node identifier index needs to be updated. The logical node identifiers in the records need not be changed.

To more particularly describe the features of the present invention, please refer to FIGS. 1 through 10B in conjunction with the discussion below.

Figure 1:
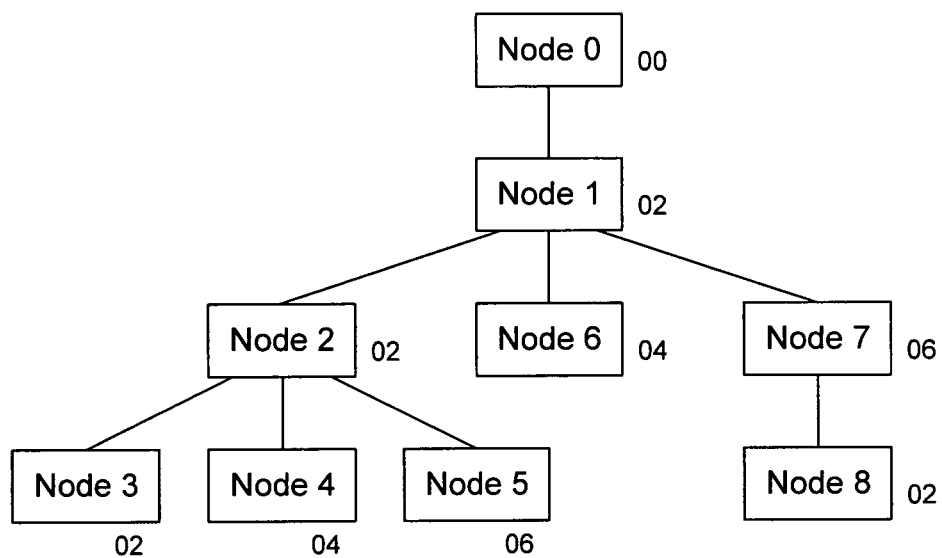
FIG. 1 illustrates an example hierarchically structured data tree containing a plurality of nodes.

FIG. 1 illustrates an example hierarchically structured data tree containing a plurality of nodes. The tree 101 can represent any type of hierarchically structured data, such as XML. Although the present invention and its embodiments may be described below in the context of XML, one of ordinary skill in the art will understand that the method and system can be applied to other types of hierarchically structure data without departing from the spirit and scope of the present invention. The tree 101 has a root node (Node 0) with one child node (Node 1). Node 1 has three child nodes (Nodes 2, 6, and 7). Nodes 2, 6, and 7 are thus sibling nodes. Node 6 is a leaf node (it has no child nodes). Node 2 has three child nodes (Nodes 3, 4, and 5). Node 7 has one child node (Node 8).

Figure 2:
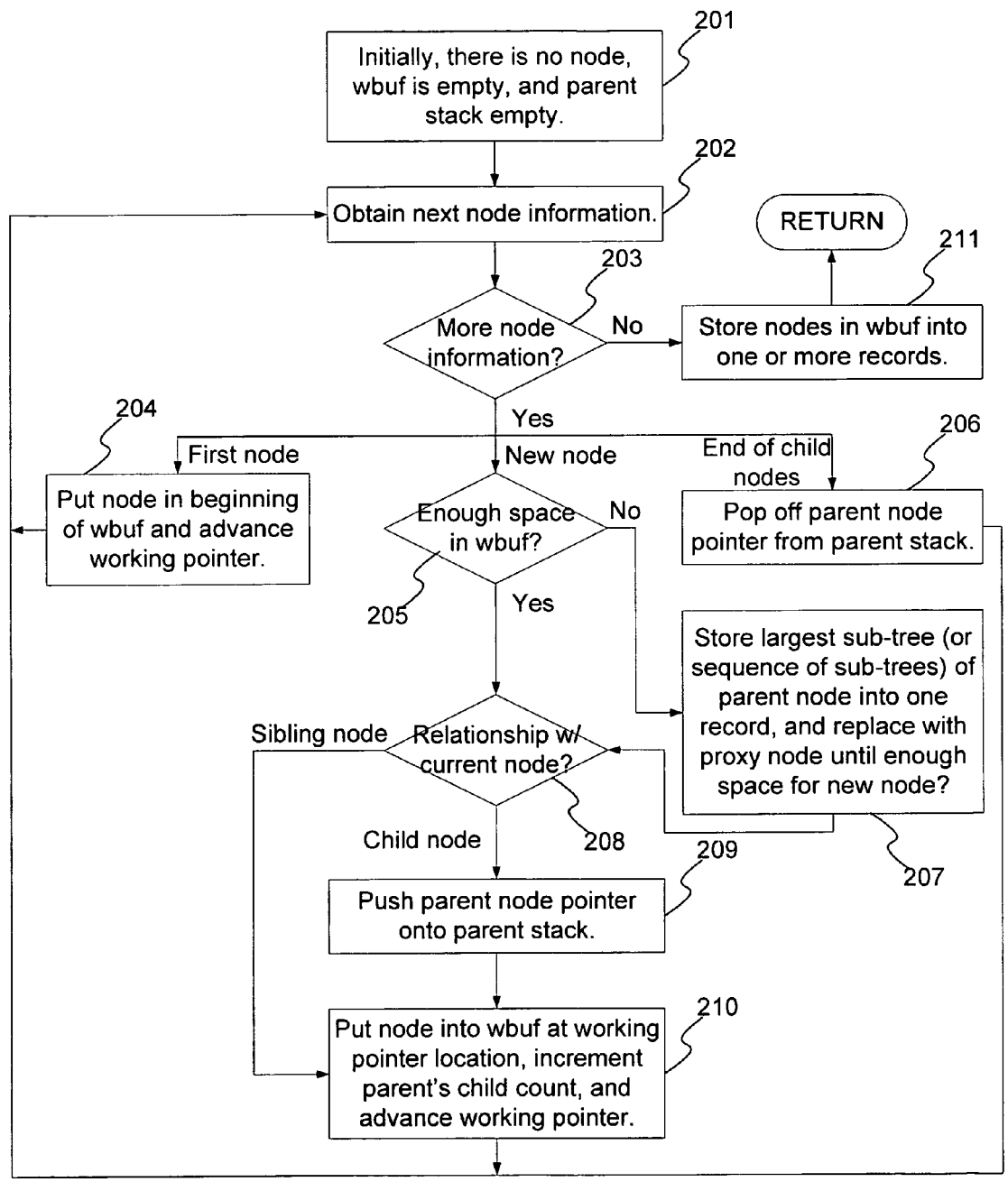
FIG. 2 is a flowchart illustrating an embodiment of a method for storing hierarchically structured data in a record data structure in accordance with the present invention.

FIG. 2 is a flowchart illustrating an embodiment of a method for storing hierarchically structured data in a record data structure in accordance with the present invention. Assume that the hierarchically structure data comprises a plurality of nodes. Initially, there is no node, a working buffer (wbuf) is empty, and a parent stack is also empty, via step 201. The next node information is then obtained, via step 202. It is then determined if there is more node information, via step 203, i.e., if the traversal of the hierarchically structured data or its equivalent token information has ended. If not, and if the node is the first node, then the node is put in the beginning of the wbuf, via step 204, and the working pointer is advanced.

If the node is a new node, then it is determined if there is enough space in the wbuf for the new node, via step 205. If not, then the largest sub-tree (or a sequence of sub-trees) of the parent node is stored into one record, via step 207. The taken-out sub-tree (or a sequence of sub-trees) is replaced with a proxy node until there is enough space for the new node. If there is enough space, then the relationship between the node and a current node is determined, via step 208. If the node is the child node of the current node, then the parent node pointer is pushed onto the parent stack, via step 209. If the node is a sibling node of the current node, then step 209 is skipped. Next, the node is put into the wbuf at the location pointed to by the working pointer, the parent's child count is incremented, and the working pointer is advanced, via step 210. If the node is an end of a set of child nodes, then the parent node pointer is popped from the parent stack, via step 206.

Eventually, there is no more node information, via step 203. At that time, the nodes stored in the wbuf is stored into one or more records, via step 211.

Figures 3, 4:
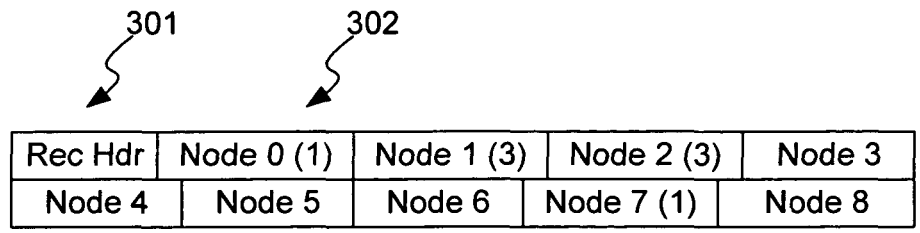
FIG. 3 illustrates an example record storing a hierarchically structured data tree in accordance with the present invention.
FIG. 4 illustrates the local and absolute node identifiers for the example tree in FIG. 1.

FIG. 3 illustrates an example record storing a hierarchically structured data tree in accordance with the present invention. In this embodiment, nodes are stored within records. A plurality of records is stored within a page. A plurality of pages is stored for a document. This type of record data structure is known in the art and will not be described in detail here. Each document is assigned a document identifier (DocID). Assume that all nodes of the tree 101 is part of the same document and can be stored within one record. The record contains a record header 301 and nodes 302. The record is assigned a record identifier (RID), which references a physical address of the record. And each node is assigned a logical node identifier (node ID). A logical node ID identifies a node based upon its relationship with the other nodes in the tree. It does not identify the physical location where the node is stored. There are two types of logical node ID's, an absolute node ID and a local or relative node ID. The local node ID of a node is assigned to the node according to its sequence under that particular parent node. Child nodes of different parent nodes are assigned local node ID's independently at each level in the tree. The absolute node ID is a concatenation of the local node ID's from the root node to the node. For example, the local node ID for Node 5 is '06' to indicate that it is the third sibling node at its level, while its absolute node ID is '020206'. The absolute node ID indicates that Node 5 is the third child node of its parent node (Node 2), where its parent node is a first child node of its grandparent node (Node 1), where its grandparent is a first child node of the root node (Node 0). The root node is assigned a local node ID of '00' and is ignored.

Returning to FIG. 3, the record header 301 contains an absolute node ID of the rooted node. Each node 302 within the record contains a node kind, node length, number of children, and the nodes for the children. It also stores its local node ID. FIG. 4 illustrates the local and absolute node IDs for the example tree 101 in FIG. 1. Logical node ID's are further described in co-pending U.S. patent application Ser. No. 10/709,415, titled "Self-Adaptive Prefix Encoding for Stable Node identifiers", filed on May 4, 2004, and assigned to the assignee of the present application. Applicant hereby incorporates this patent application by reference. The logical node ID provides stable node encodings that allow for arbitrary insertion, deletion or replacement of nodes. Existing node ID's need not be modified when a node is inserted, deleted, or replaced to keep node ID's in document order. This holds true because a logical node ID is not modeled as a fixed string of decimal numbers, but rather as a variable-length binary string.

In this embodiment, the storage of the tree 101 into records is based on a preorder traversal process, known in the art. However, other types of traversal processes can be used. With the preorder traversal processing, as the nodes are constructed, a grouping logic keeps track of the sub-tree being constructed for the length of the sub-tree rooted at the current node. For example, assume that the maximum record size, R, is known. A working buffer of 2×R or more in size is used in the construction. If the entire tree is smaller than R, then the entire tree is stored into one record. Otherwise, the tree is split into multiple records. The storage of a tree in multiple records is described further below.

For example, referring to both FIGS. 1 and 3, the root node (Node 0) is first stored with an indication that it has one child node. Its child node (Node 1) is then stored with an indication that it has three child nodes. Next, the first child node (Node 2) is stored with an indication that it has three child nodes. These child nodes (Nodes 3, 4, and 5) are then stored. The traversal process returns to Node 2 and continues with the next sibling node (Node 6). Nodes 6 and 7 are then stored, with an indication that Node 7 has one child. Node 8 is then stored after Node 7. Thus, with the present invention, the relationships among the nodes of the tree 101 are captured by the nesting structure. No explicit links are used.

Figure 5:
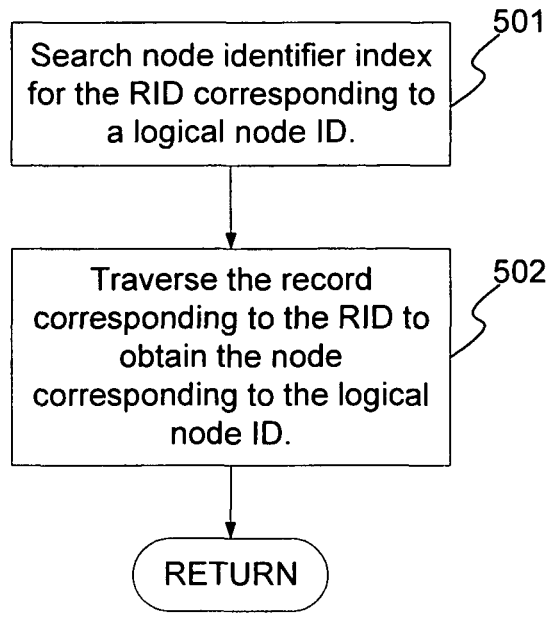
FIG. 5 is a flowchart illustrating a search for a node of the hierarchically structured data in accordance with the present invention.

Referring now to FIG. 5, to obtain a node with a given logical node ID, such as in response to a query, the node identifier index is searched, via step 501, to obtain the RID corresponding to a logical node ID. The record corresponding to the RID is then traversed to obtain the node corresponding to the logical node ID, via step 502. To locate the node inside the record, the same traversal process used when storing the tree is used to locate the node with the local node ID at each level.

A hierarchically structured data tree is stored within a single record whenever possible. Occasionally, multiple records are required to store the hierarchically structured data tree. When more than one record is required, the method in accordance with the present invention stores sub-trees in a separate record, and represents this sub-tree in the parent record with a "proxy node", which itself does not contain a logical node ID. Assume for example, that the tree 101 in FIG. 1 cannot be stored within one record. The sub-tree of Node 2, containing Nodes 2, 3, 4, and 5, is then stored in a separate record. Here, each record stores one sub-tree.

Figure 6:
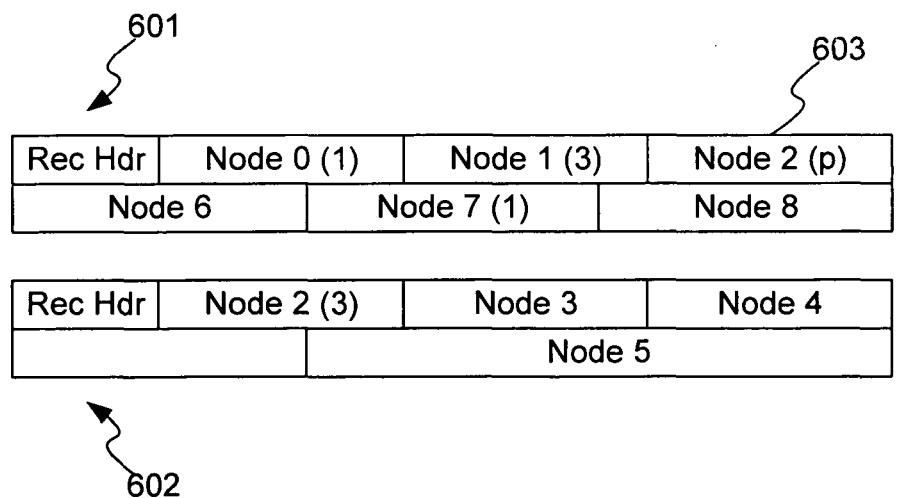
FIG. 6 illustrates example records for storing a tree across multiple records in accordance with the present invention.

Assuming again that the maximum record size, R, is known, as the nodes are constructed node by node in the preorder traversal process, if the entire tree is larger than R, then the tree is split into multiple records. The largest sub-tree is searched and copied into a separate record. The copied sub-tree is replaced with a proxy node, and the length of the nodes in the separate record is excluded from the calculation of the sub-tree length. Only the length of the proxy node is included. All the length information is updated accordingly. FIG. 6 illustrates example records for storing a tree across multiple records in accordance with the present invention. Here, the parent record 601 contains a proxy node 603 that represents the sub-tree rooted in Node 2.

Figures 7, 8:
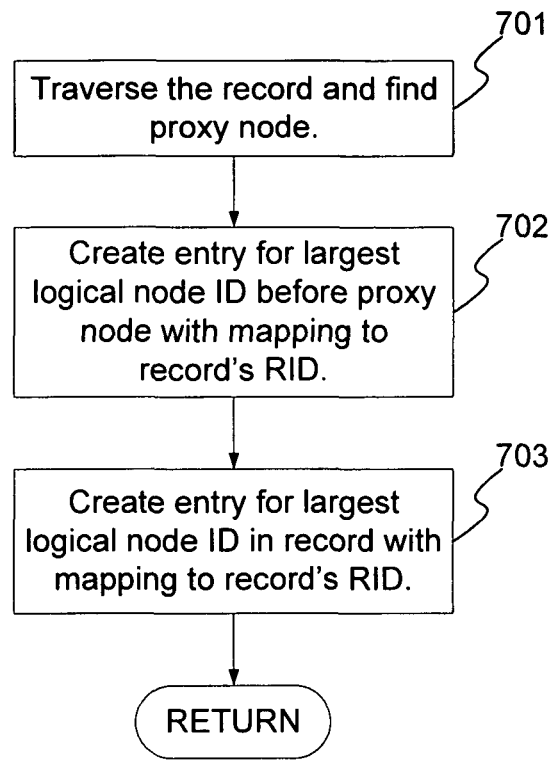
FIG. 7 is a flowchart illustrating a method for generating the node identifier indexes for records with proxy nodes in accordance with the present invention.
FIG. 8 illustrates example entries of the node identifier index in accordance with the present invention.

In order to find the sub-tree nodes represented by a proxy node, a node identifier (node ID) index is created. This index is to map a node ID to the RID of a record that contain the node with the given node ID. All the node IDs in document order can be viewed as points in a line. The records break this line into a plurality of intervals. The node ID index contains the upper end point of each interval. FIG. 7 is a flowchart illustrating a method for generating the node identifier indexes for records with proxy nodes in accordance with the present invention. First, the record is traversed to find the proxy node, via step 701. An entry is then created for the largest logical node ID before the proxy node, via step 702, with a mapping to the record's RID. Another entry is created for the largest node ID in the record, via step 703, with a mapping to the record's RID. These entries represent the range of logical node ID's that encompass the tree. For a logical node ID that falls within any two of entries, the greater RID is used to locate the node.

For example, referring to FIG. 8, assume that node identifier index entries are being created for the records 601 and 602 (FIG. 6). First, the record 601 is traversed to find the proxy node 603, via step 701. Node 1 has the largest logical node ID before the proxy node 603, so an entry 801 is created for Node 1 with a mapping to the RID for the record 601 (rid2), via step 702. Node 8 has the maximum logical node ID in the record 601, so an entry 803 is also created for Node 8 with a mapping to the RID (rid2) of the record, 601, via step 703. For record 602, there are no proxy nodes, so steps 701 and 702 are skipped. Node 5 has the largest logical node ID for the record 602, so entry 802 is created for Node 5 with a mapping to the RID (rid 1) for the record 602, via step 703.

Thus, to locate Node 4 with logical node ID '020204', for example, a search of the node identifier index finds the three entries 801-803. The identifier '020204' is greater than '02' of entry 801, but less than '020206' of entry 802. Node 4 is thus mapped to the RID (rid1) for the sub-tree record 602. If Node 8 with logical node ID '020602' is to be located, '020602' is greater than '020206' of entry 802 and equal to '020602' of entry 803. Node 8 is thus mapped to the RID (rid2) for the parent record 601.

By using proxy nodes to reference sub-tree nodes stored outside of a parent record, the storage of hierarchically structured data is significantly more scalable than conventional methods. This is especially true since the nodes of the tree are stored as a few records, and the nodes of sub-trees can be moved together more efficiently. When nodes are updated, the records may require reorganization once it is discovered that not all nodes of the tree can be stored in one record. Upon this discovery, a sub-tree that can be stored in a separate record is identified. The nodes of the sub-tree are then replaced with the proxy node. If the records are less clustered, reorganization can be performed to make records in document order again. Because references between records are accomplished through logical node ID's rather than explicit references, this reorganization is significantly more easily accomplished, allowing greater scalability.

Figure 9A:
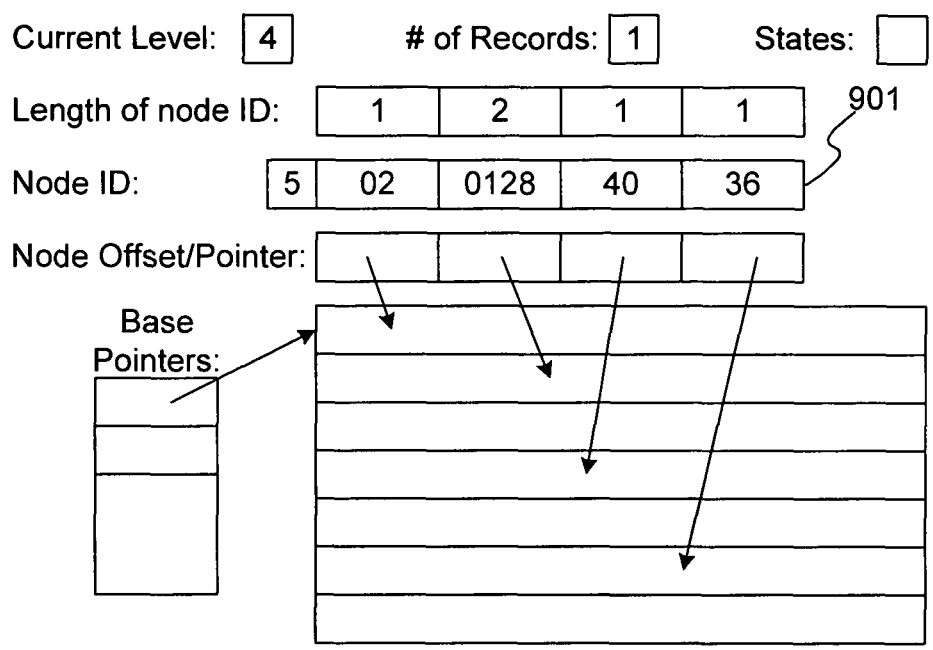
FIGS. 9A and 9B illustrate in more detail the tree traversal process used by the method in accordance with the present invention.
Figure 9B:
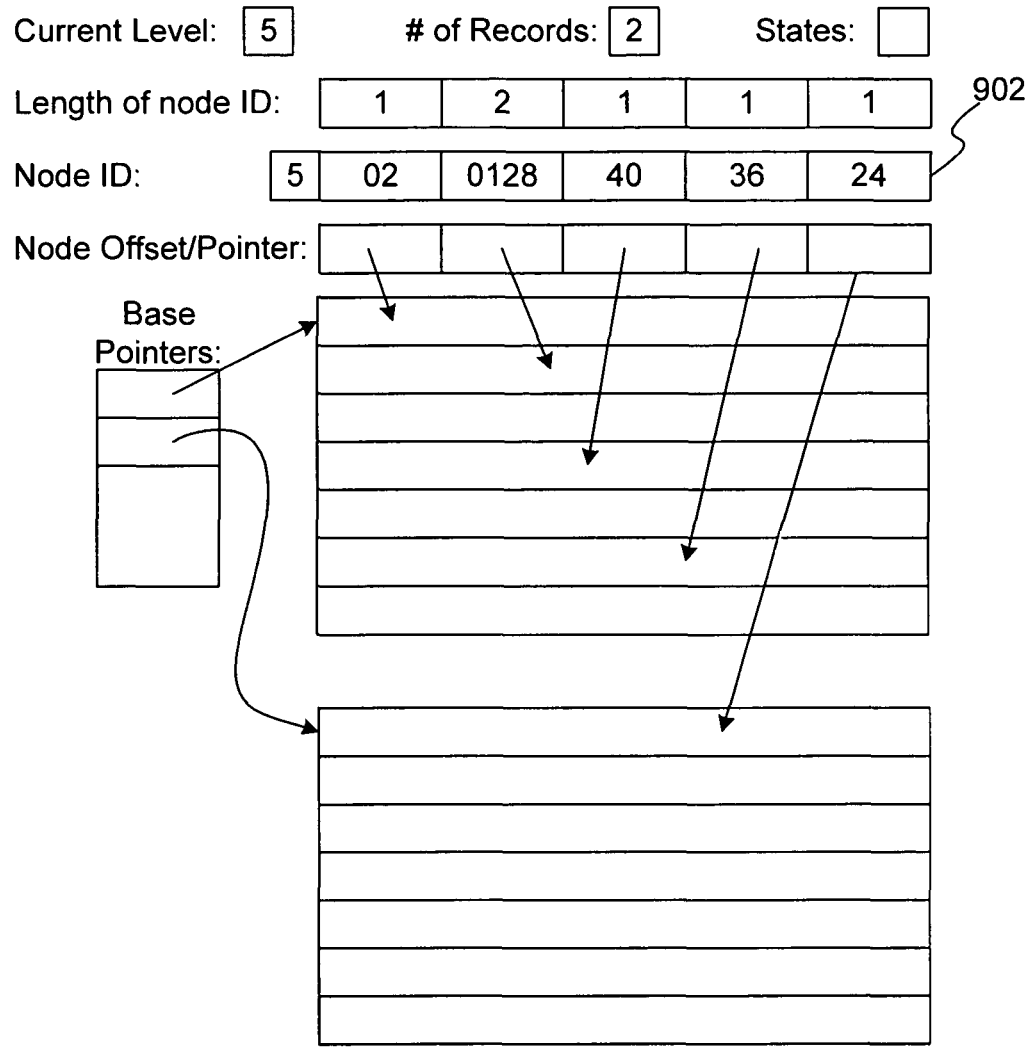

FIGS. 9A and 9B illustrate in more detail the tree traversal process used by the method in accordance with the present invention. FIG. 9A illustrates the traversal process with one record, while FIG. 9B illustrates the traversal process with two records. A stack is used to track each level of nodes. In FIGS. 9A and 9B, the node ID's 901-902 are absolute node ID's in a variable-length binary string (2-byte length, followed by the node ID encoding). The length of each local node ID is kept in a separate array. Both node ID and length of node IDs are used as a stack when the tree nodes are traversed. The level is used as the stack top pointer. This way, the (absolute) node ID can be maintained easily, and is always available as a variable-length binary string format. In-scope namespaces in the XQuery data model can be similarly maintained for each node.

Here, a sub-tree starts at a current node and ends at the current node start position plus the sub-tree length. A tree can be traversed using two primitives: getFirstChild and getNextSibling. The primitive 'getFirstChild' starts from the current node, and if the number of children is '0', then 'not found' is returned. Otherwise, the next node is the first child. The primitive 'getNextSibling' starts from the current node, and if it is the root node, then 'not found' is returned. Otherwise, the total sub-tree length rooted at the current node is added to the start position of the node to get the next node position. If it is beyond the sub-tree rooted at the parent node, then 'not found' is returned. Otherwise, that next node is the next sibling.

If a proxy node is encountered, the search key for the node ID index is set to '(DocID, node ID)'. The index will return the RID of the record that contains the node. This record is then fetched and the traversal continues. To find a node with a given node ID, a node with the local node ID at each level is found using the above two primitives.

Figure 10A:
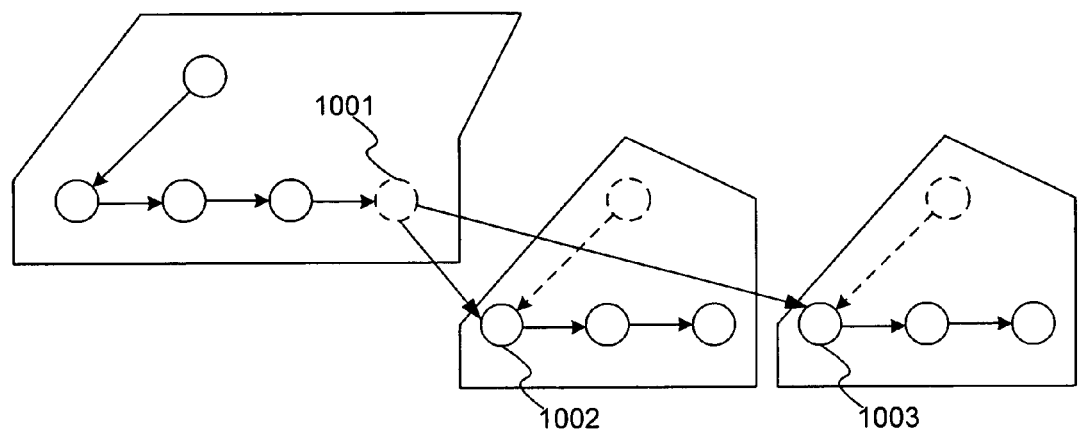
FIGS. 10A and 10B illustrate range proxy nodes in accordance with the present invention.
Figure 10B:
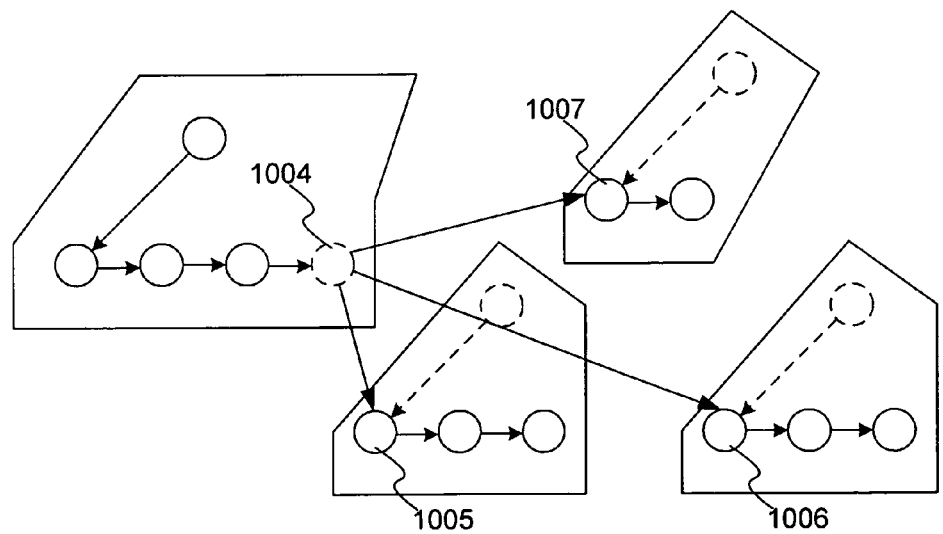

To further improve efficiency, a proxy node, called a range proxy node, can represent a sequence of sub-trees contained in a record, and multiple proxy nodes next to each other within a record can be collapsed into a single "range proxy node". For example, as illustrated in FIG. 10A, a range proxy node 1001 can represent two proxy nodes that are collapsed, each of which represents a sequence of sibling nodes (or sub-trees) 1002-1003 stored in a separate record. For another example, as illustrated in FIG. 10B, a range proxy node 1004 can represent multiple proxy nodes 1005-1007, each corresponding to a record that may contain a sub-tree or multiple sub-trees.

An improved method and system for storing hierarchically structured data in relational data structures are disclosed. The method and system uses logical node identifiers to reference the nodes of a hierarchically structured data stored within and across relational data structures, such as records or pages of records. A node identifier index is used to map each logical node ID to a RID for the record that contains the node. When a sub-tree is stored in a separate record, a proxy node is used to represent the sub-tree in the parent record. The mapping in the node identifier index is then updated to reflect the storage of the sub-tree nodes in the separate record. This storage scheme supports the following:

Clustering. To support document order clustering, the DocID and node ID for the sub-tree root are used. To improve the efficiency of the clustering, the DocID and the minimum node ID of the nodes, which is also the absolute node ID of the sub-tree root, can be put into separate fields within the record of nodes.

Update. A sub-document update can be performed with the record as the unit. Insert, delete, or replace of a sub-tree can be performed easily.

Re-organization of records. Since the references between the records are through logical node ID's, then there is no limitation to the moving of records across pages, as long as the indices are updated or rebuilt to maintain synchronization with the resulting data pages.

Partitioning. Even a document can be partitioned based on node ID ranges.

The method and system in accordance with the present invention thus is significantly more scalable than conventional approaches. It has a much smaller storage consumption than conventional object approaches that uses explicit references between nodes. They can also leverage existing indexing approaches and reuse some of its utilities.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An article of manufacture comprising a non-transitory computer storage medium having computer readable program code that is executed by a computer to implement a method to store hierarchically structured data in record data structures, said method as executed by said computer comprising:
    accessing a hierarchically structured data comprising a plurality of nodes that do not fit in one record having a predefined maximum record size;
    identify at least one largest sub-tree in said hierarchically structured data;
    for each node in said identified largest sub-tree, storing, in a record: a node number, local node ID assigned to a node according to the node's sequence under a particular parent node, and an absolute node ID that is a concatenation of local node IDs from a root node to a given node; and
    for a remainder of nodes in said plurality of nodes, storing, in at least one other record, for each node in said plurality of nodes: a node number, local node ID assigned to a node according to the node's sequence under a particular parent node, an absolute node ID that is a concatenation of local node IDs from a root node to a given node, and a pointer representing a proxy node pointing to said record associated with said largest sub-tree.

2. The article of manufacture of claim 1, wherein the hierarchically structured data is XML data.

3. A method implemented by executing, by a computer, computer readable program code to store hierarchically structured data in record data structures, said computer executing said computer readable program code to:
    access a hierarchically structured data comprising a plurality of nodes that do not fit in one record having a predefined maximum record size;
    identify at least one largest sub-tree in said hierarchically structured data;
    for each node in said identified largest sub-tree, store, in a record: a node number, local node ID assigned to a node according to the node's sequence under a particular parent node, and an absolute node ID that is a concatenation of local node IDs from a root node to a given node; and
    for a remainder of nodes in said plurality of nodes, store, in at least one other record, for each node in said plurality of nodes: a node number, local node ID assigned to a node according to the node's sequence under a particular parent node, an absolute node ID that is a concatenation of local node IDs from a root node to a given node, and a pointer representing a proxy node pointing to said record associated with said largest sub-tree.

4. The method of claim 3, wherein the hierarchically structured data is XML data.

5. A system to store hierarchically structured data in record data structures, said system comprising:
    a processor;
    computer storage storing computer readable program code;
    said processor executing said computer readable program code to:
        access a hierarchically structured data comprising a plurality of nodes that do not fit in one record having a predefined maximum record size;
        identify at least one largest sub-tree in said hierarchically structured data;
        for each node in said identified largest sub-tree, store, in a record in said storage: a node number, local node ID assigned to a node according to the node's sequence under a particular parent node, and an absolute node ID that is a concatenation of local node IDs from a root node to a given node; and
        for a remainder of nodes in said plurality of nodes, store, in at least one other record in said storage, for each node in said plurality of nodes: a node number, local node ID assigned to a node according to the node's sequence number under a particular parent node, an absolute node ID, and a pointer representing a proxy node pointing to said record associated with said largest sub-tree.

6. The system of claim 5, wherein the hierarchically structured data is XML data.

* * * * *